Feb. 7, 1939.  H. MOVER  2,146,085

CUSHION

Filed April 21, 1938

Inventor
HYMAN MOVER
by *Ezekiel Wolf*
Attorney

Patented Feb. 7, 1939

2,146,085

UNITED STATES PATENT OFFICE 2,146,085

CUSHION

Hyman Mover, Newton North, Mass.

Application April 21, 1938, Serial No. 203,308

2 Claims. (Cl. 155—182)

The present invention relates to cushions and more particularly cushions to be used in connection with seats that may already be upholstered or may be plain.

In particular the present invention relates to a type of cushion which may be used in an automobile seat or vehicle where the driver must sit for comparatively long periods of time in a restrained or tense position or maintain a peculiar posture for which the seat is not designed.

In automobiles it is not customary to design the drivers' portion of the front seat any differently from the rest of the front seat, except of course in special types of machines, as for instance taxi-cabs and busses. It is therefore true that as a rule the front seat is designed for ordinary lounging comfort and his back is inclined in an unnatural and unsupported position when he is driving an automobile. Ordinarily the driver must bend forward although when driving on open roads the driver may sometimes recline and relax.

It is important for health as well as for comfort and safety in driving for the driver to have correct posture. In the present type of front seats, the long muscles of the back and the sacro-iliac joints are subject to undue strain and when the driver leans backwards, he usually slides forward, not only stretching the muscles and joint ligaments, but leaving the lower part of his back entirely unsupported by any part of the seat. This improper and incomplete support of the back leads to fatigue and backache and general discomfort. In addition to this cars are designed so that there is one best position for the driver to assume both with regard to seeing the road through the wind-shield without distorted or impaired vision and also with regard to positioning the hands and feet for efficiently and quickly operating the controls.

In the present invention the cushion is applied and used to overcome the disadvantages present in the construction of the automobile seat as well as for general purposes.

The cushion of the present invention comfortably maintains the erect posture of the driver and prevents him from slipping into an improper or unhygienic posture or position. Further the cushion supports the sacro-iliac joints and the long muscles of the back and thereby avoids fatigue that usually results in backaches after long drives.

Further the cushion of the present invention may be used in one of two positions. In one position with the thinner part on the top, the driver is allowed a more relaxed position, but at the same time supported firmly both at the sides and the middle of the back. In the second position that the cushion may be used, the driver is given a posture inclining the back somewhat more forward to the steering wheel than in the first position in which the cushion may be used. In either position the driver's back is fully and comfortably supported so that no fatigue results in a tired back even after long hours of driving.

The present invention will be more fully described in connection with the drawing illustrating an embodiment of the same in which:—

The cushion may be made of any suitable material, with a covering of leather, leatherette, cloth, or any other kind of fabric that is flexible yet tending however to hold and maintain a smooth and unwrinkled surface except for the tufting or buttons as shown. The cushion may be filled with any suitable kind of hair, floss, cotton, or any filling material that will substantially hold the form given, but will be sufficiently resilient to conform to the positions desired. Since the cushion is to preserve its shape and form, it is not necessary or advisable to use such materials that do not aid in this respect.

Figure 1:
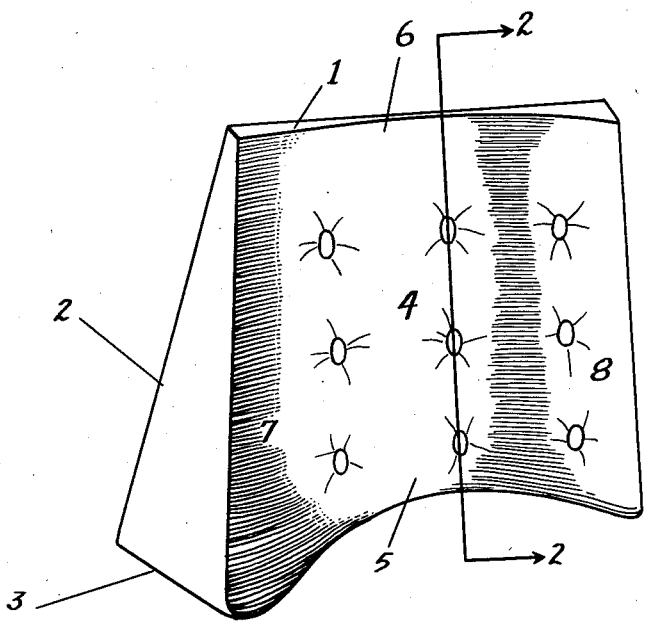
Figure 1 shows a perspective view of the cushion.

In the perspective view of the cushion shown in Figure 1, it has a general wedge shape appearance with a top edge 1 in which the back and front faces substantially come together. The back surface of the cushion 2 is preferably flat and not curved in any manner. Because of this the cushion may be used in reverse positions, with the lower end 3 and the upper end 1 turned about from the position indicated in Figure 1.

The bottom face of the cushion 3 is preferably flat and considerably wider than the top face or edge 1. The front face 4 of the cushion is curved or arched inwardly so as to make a concave surface with a larger concavity at the lower portion 5 than at the upper portion 6. This construction brings the sides 7 and 8 of the face 4 of the cushion further around the body, thus providing both a side and a back support for the back itself. From the lower portion of the cushion 5 to the upper portion 6 the curved surface gradually flattens so that at th etop edge 1 the curve has become practically flat and may even merge into a flat straight portion at the top edge 1.

Figures 2, 3:
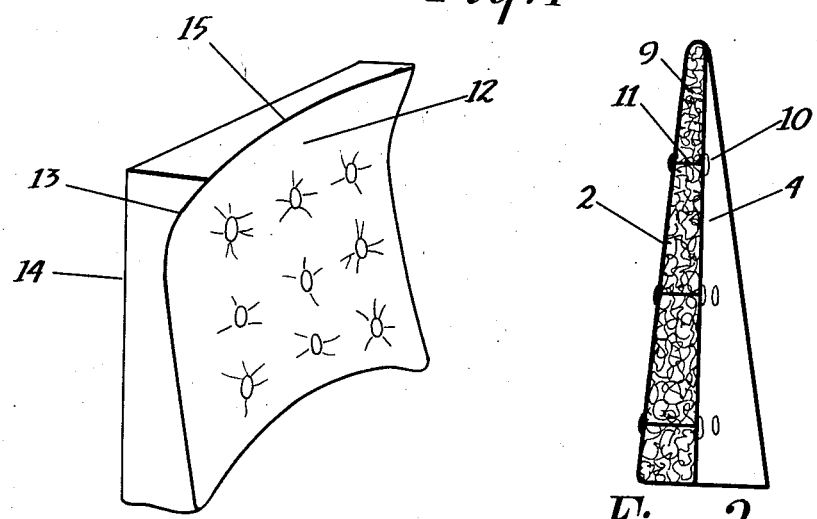
Figure 2 shows a sectional view on the line 2—2 of Figure 1.
Figure 3 shows a modified form of the cushion.

Any suitable means for supporting the filling material 9 as indicated in Figure 2 may be used. The conventional means of holding the back and front together with buttons 10 and thread 11 between the back and front faces may be employed, or if preferred the back and fronts may be stitched without buttons on the front surface.

A modified form of the cushion is shown in Figure 3. This is similar to the cushion shown in Figure 2 with the exception of the top portion 12 which is arched forward as indicated at the side by the number 13. This arch may be curved away from the straight back 14 to an amount to provide contact and support when the back is inclined slightly forward as when the driver leans a little more than usual towards the steering wheel. The top in this case may be inwardly arched as indicated at 15 similar to the top 6 in Figure 1, the chief distinction between Figure 3 and Figure 1 being that the top edge is somewhat broader than a portion of the cushion just below it.

In the use of the cushion, if the driver wishes to take full advantage of a reclining position, the cushion may be inserted between the back and the seat vertically as in the manner indicated in Figure 1. If however the driver wishes to be propped forward slightly, the cushion will be reversed with the lower part as indicated in Figure 1 on top. In either position, the parts at the side of the cushion as for instance 7 and 8 will fit at the side of the back and tend to provide a support against the ribs. Either position will provide a natural support for the back and at the same time allow sufficient yielding to the back so that the driver may move about without losing the support that the cushion furnishes.

Having now described my invention, I claim:—

1. A resilient yielding cushion adapted to be used in a driver's seat of an automobile, consisting of a yielding cover filled with resilient flexible means adapted to hold its shape, said cover being formed with a flat back surface and a concave front surface, the concave front surface being concaved to a greater degree at one end than at the other, said surfaces being sloped towards one another to form a wedge shaped device, the concave surface being more concaved at the thicker part of the wedge than at the thinner part.

2. A cushion adapted to be used in combination with a seat, comprising a cover filled with resilient, flexible material, adapted to hold its shape, said cover being formed with a flat back surface and a concave front surface, the concave front surface being concaved to a greater degree at one end than the other, said surfaces being sloped towards one another to form a wedge shaped device, the concave surface being more concaved at the thicker part of the wedge than at the thinner part and being extended at the sides at said thicker part to form supports for the sides of the body as well as the back of the person using the seat.

HYMAN MOVER.